(12) United States Patent
Thom

(10) Patent No.: US 6,343,749 B1
(45) Date of Patent: Feb. 5, 2002

(54) MOBILE DRIP IRRIGATION SYSTEM

(75) Inventor: David W. Thom, Juniata, NE (US)

(73) Assignee: T-L Irrigation Company, Hastings, NE (US)

( * ) Notice: Subject to any disclaimer, the term of this patent is extended or adjusted under 35 U.S.C. 154(b) by 0 days.

(21) Appl. No.: 09/813,242

(22) Filed: Mar. 20, 2001

(51) Int. Cl.$^7$ .............................................. B05B 17/00
(52) U.S. Cl. .......................... 239/1; 239/722; 239/723; 239/726; 239/734; 239/542
(58) Field of Search .......................... 239/1, 722, 723, 239/734, 726, 542, 569, 547

(56) References Cited

U.S. PATENT DOCUMENTS

| | | | |
|---|---|---|---|
| 2,174,600 A | | 10/1939 | Schutmaat ...................... 61/12 |
| 3,498,314 A | * | 3/1970 | Gheen .......................... 239/734 |
| 3,870,235 A | * | 3/1975 | Newell .................... 239/159 X |
| 4,350,295 A | | 9/1982 | Gheen ......................... 239/178 |
| 4,429,831 A | * | 2/1984 | Maddox ...................... 239/177 |
| 4,676,438 A | * | 6/1987 | Sesser .......................... 239/722 |
| 4,763,836 A | * | 8/1988 | Lyle et al. .............. 239/727 X |
| 4,771,947 A | * | 9/1988 | Smeller et al. ......... 239/542 X |
| 4,970,973 A | | 11/1990 | Lyle et al. .................. 111/127 |
| 5,267,695 A | * | 12/1993 | Thayer .................. 239/542 X |
| 5,421,514 A | | 6/1995 | McKenry ..................... 239/10 |
| 5,586,728 A | | 12/1996 | McKenry .................... 239/734 |
| 5,779,163 A | * | 7/1998 | Gunter ........................ 239/734 |

* cited by examiner

Primary Examiner—David A. Scherbel

(57) ABSTRACT

A mobile drip irrigation system includes an existing mobile irrigation system with the sprinkler heads removed and drip lines connected to the locations of the removed sprinkler heads. Each drip line includes a drop line extending from the irrigation system supply pipe, generally vertically to a lower end spaced slightly above the ground. A drip hose is connected to the lower end of each drop line and has a plurality of drip irrigation emitters along the length thereof. A weight is attached to the lower end of each drop line to maintain the drop line in a generally vertical orientation as the irrigation system moves through the field.

12 Claims, 3 Drawing Sheets

MOBILE DRIP IRRIGATION SYSTEM

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to field irrigation systems, and more particularly to an improved irrigation system which combines the water efficiency of surface drip irrigation with the flexibility and economic advantages of center pivot or linear move irrigation systems.

(2) Background Information

Conventional mobile irrigation systems may be classified in two general types: center pivot, and linear move. A center pivot irrigation system includes a central pump station which supplies a source of water, and a plurality of towers extending radially from the central pump station and carrying a supply pipe. The supply pipe has a plurality of uniformly spaced sprinkler heads which spray water along the length of the supply pipe. The towers include driven wheels and move in a circular pattern about the central pump station.

A linear move irrigation system includes a plurality of towers with driven wheels, the towers carrying a water supply pipe having sprinkler heads distributed along the pipe. One end of the supply pipe is then connected to a source of water, and the entire pipe is moved in a direction perpendicular to the axis of the pipe, to irrigate a field.

These mobile irrigation systems are popular because of their flexibility and economics. However, the water efficiency of prior art mobile irrigation systems is quite poor. This low water efficiency is mainly due to water evaporation and wind drift, because the sprinkler heads are located high above the ground (typically 15–20 feet) along the supply pipe carried by the mobile towers.

Another problem with prior art mobile irrigation systems relates to the fact that the wheels on the towers are continuously moving over wet ground. The weight of the irrigation system carried by the towers is substantial, and the wet soil permits the wheels to form deep tracks in the ground.

BRIEF SUMMARY OF THE INVENTION

It is therefore a general object of the present invention to provide an improved mobile drip irrigation system.

Another object of the present invention is to provide an improved mobile drip irrigation system which has a greatly increased water efficiency as compared to traditional sprinklers on prior art mobile irrigation systems.

A further object is to provide an improved mobile drip irrigation system which eliminates water from being sprayed in the tracks of the wheels of the mobile towers.

These and other objects of the present invention will be apparent to those skilled in the art.

The mobile drip irrigation system of the present invention includes an existing mobile irrigation system with the sprinkler heads removed and drip lines connected to the locations of the removed sprinkler heads. Each drip line includes a drop line extending from the irrigation system supply pipe, generally vertically to a lower end spaced slightly above the ground. A drip hose is connected to the lower end of each drop line and has a plurality of drip irrigation emitters along the length thereof. A weight is attached to the lower end of each drop line to maintain the drop line in a generally vertical orientation as the irrigation system moves through the field.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
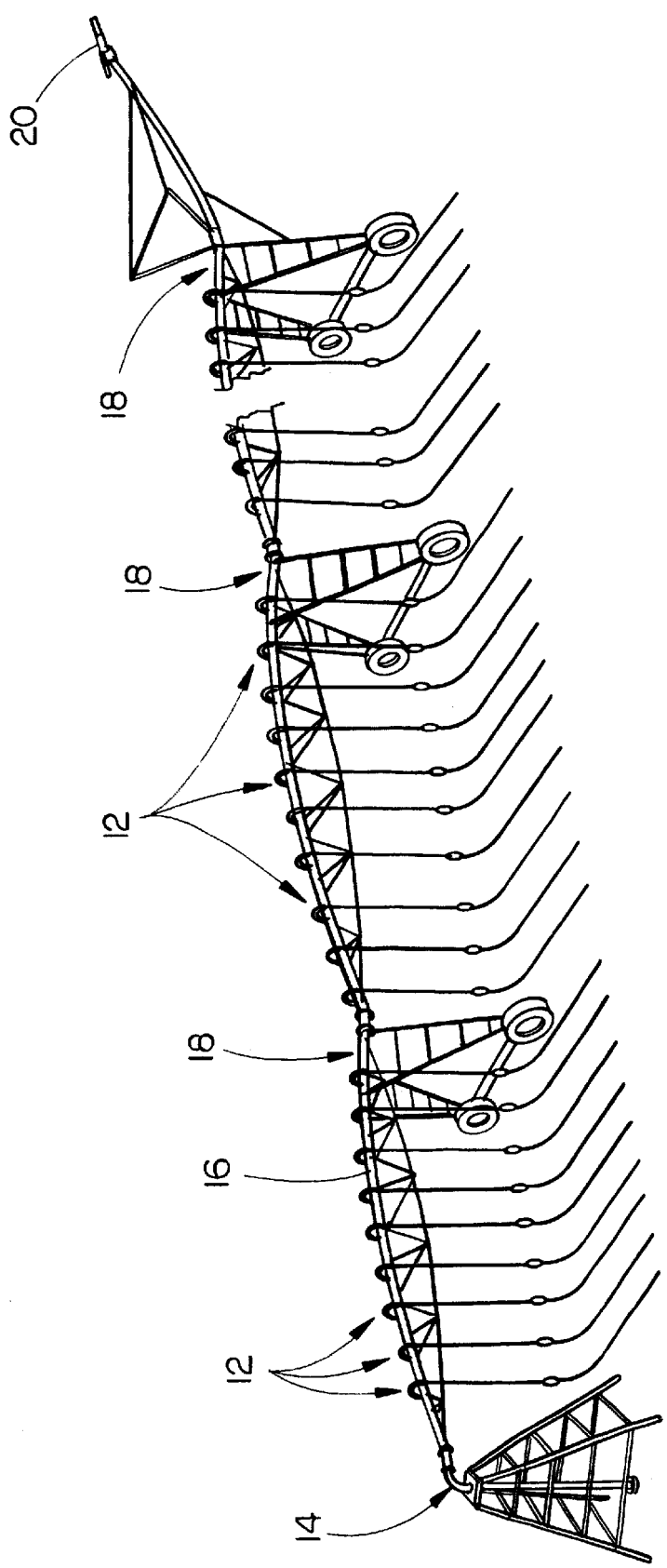
FIG. 1 is a pictorial view of a center pivot irrigation system utilizing the mobile drip system of the present invention.

Referring now to the drawings, and more particularly to FIG. 1, the mobile drip irrigation system of the present invention is designated generally at 10, and includes a number of components of a prior art mobile irrigation system in combination with a plurality of drip lines designated generally at 12 for modifying the existing irrigation system.

Figure 2:
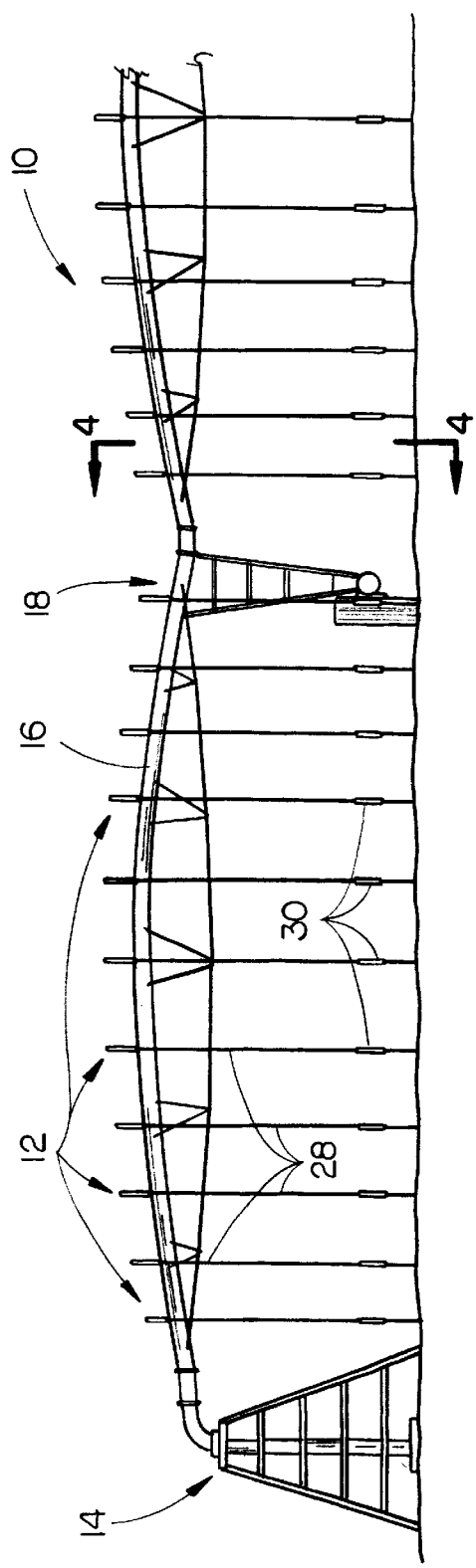
FIG. 2 is a front elevational view of a portion of the irrigation system shown in FIG. 1.
Figure 3:
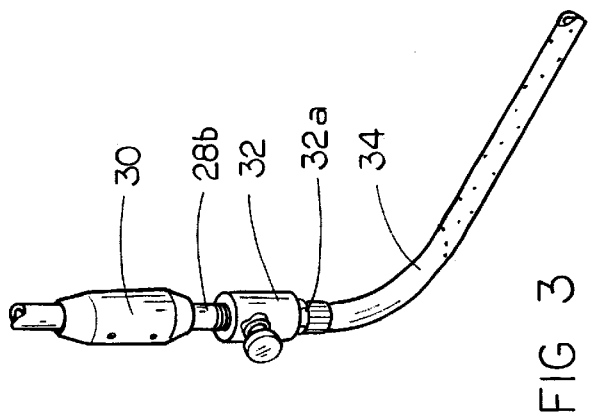
FIG. 3 is an enlarged view of the drop line and drip hose utilized with the drip irrigation system of the present invention.

Throughout the drawings, a conventional center pivot irrigation system is shown and described, although the drip lines 12 of the present invention can also be utilized in the same fashion to modify prior art linear move irrigation systems. The existing components of the mobile irrigation system include a water source 14 (which in FIGS. 1 and 2 is a center pivot water pump station), an elongated water supply pipe 16 extending outwardly from the water source 14, and a plurality of mobile towers 18 spaced substantially uniformly along supply pipe 16. A spray nozzle 20 may be utilized at the distal end of supply pipe 16, or may be replaced with a closed end cap (not shown).

Figure 4:
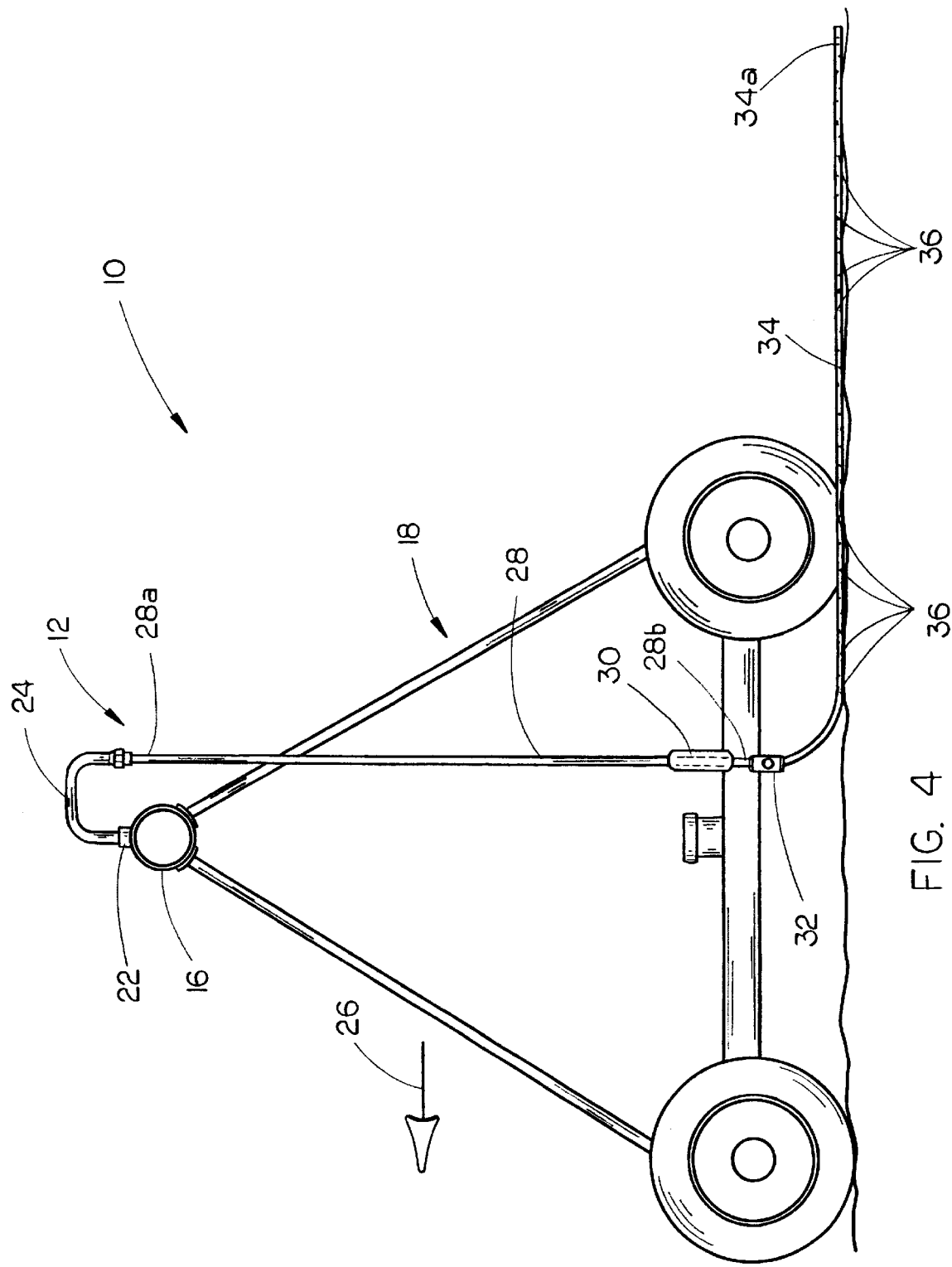
FIG. 4 is a sectional view taken at lines 4—4 in FIG. 2.

As shown in FIGS. 1, 2, and 4, supply pipe 16 includes a plurality of ports 22 which would normally have sprinkler heads operably mounted thereon, for spraying water. These conventional sprinkler heads (not shown) have been removed and replaced with drip lines 12 of the present invention.

Each drip line 12, as shown in detail in FIG. 4, includes a rigid tubular gooseneck connected to port 22 and extending rearwardly therefrom (relative to the forward movement of tower 18 as designated by arrow 26). A flexible tubular drop line 28 is connected at an upper end 28a to gooseneck 24, and extends vertically downwardly to a lower end 28b. Each drop line 28 has a collar weight 30 attached to the lower end thereof, to assist in maintaining drop line 28 in a generally vertical orientation as tower 18 moves through the field.

A regulator 32 is mounted on the lower end of drop line 28, to regulate the fluid pressure of water exiting drop line 28. A flexible drip hose 34 is connected to the outlet 32a of regulator 32. Drip hose 34 includes a plurality of drip irrigation openings (or emitters) 36 at spaced intervals therealong. In the preferred embodiment of the invention, the drip hose 34 has emitters designed to dispense approximately four gallons per hour per foot of liquid.

Because towers 18 support the water supply pipe 16 a substantial distance above the ground, collar weights 30 are needed to counteract the drag produced by drip hose 34 in contact with the ground. Without collar weight 30, the forward end 34b of drip hose 34 would be located much higher in the air, and drop line 28 would extend at a substantial angle relative to vertical as the tower 18 moves forward. This is undesirable, because the drip hoses 34 would not follow the furrow between rows of crops, but would rather cross over the rows and potentially damage or kill some of the crops.

Whereas the invention has been shown and described in connection with the preferred embodiment thereof, many modifications, substitutions and additions may be made which are within the intended broad scope of the appended claims.

I claim:

1. In combination:

a mobile irrigation system, comprising:
        a liquid source;
        a supply pipe connected at one end to the water source and extending therefrom;
        at least one tower supporting the supply pipe above the ground, and including drive means for moving the tower and supply pipe in a forward direction; and
        a plurality of ports along the supply pipe; and
    a plurality of drip lines fluidly connected to said supply pipe ports, for distributing liquid, each drip line including:
        a flexible tubular drop line having an upper end connected to one of said ports, and a lower end spaced above but proximal to the ground;
        a weight connected to the drop line proximal the lower end having weight sufficient to maintain the drop line generally vertical as the tower moves forward; and
        a drip hose fluidly connected to the lower end of the drop line and extending rearwardly therefrom with substantially its entire length in contact with the ground, including a plurality of drip irrigation emitters uniformly spaced along substantially the entire length thereof.

2. The combination of claim 1, wherein said ports are located on an upper side of said supply pipe, and wherein each drip line further includes a rigid tubular inverted "U"-shaped gooseneck fluidly connecting a port to a drop line upper end.

3. The combination of claim 2, further comprising a fluid regulator interposed between each drip hose and the associated port on the supply pipe.

4. The combination of claim 3, wherein each regulator is interposed between each drip hose and drop line.

5. The combination of claim 1, further comprising a fluid regulator interposed between each drip hose and the associated port on the supply pipe.

6. The combination of claim 1, wherein the mobile irrigation system is a center pivot irrigation system.

7. A mobile drip irrigation system, comprising:
    a liquid source;
    a supply pipe connected at one end to the water source and extending therefrom;
    at least one tower supporting the supply pipe above the ground, and including drive means for moving the tower and supply pipe in a forward direction; and
    a plurality of ports along the supply pipe;
    a plurality of flexible tubular drop lines, each drop line having an upper end connected to one of said plurality of ports, and a lower end spaced above but proximal to the ground;
    a plurality of weights, each weight connected to a drop line proximal the lower end, and having a weight sufficient to maintain the drop line generally vertical as the tower moves forward; and
    a plurality of drip hoses, each drip hose fluidly connected to the lower end of one of the drop lines, and extending rearwardly therefrom with substantially its entire length in contact with the ground;
        each drip hose including a plurality of drip irrigation emitters along the substantially entire the length thereof.

8. The irrigation system of claim 7, wherein said ports are located on an upper side of said supply pipe, and wherein each drip line further includes a rigid tubular inverted "U"-shaped gooseneck fluidly connecting a port to a drop line upper end.

9. The irrigation system of claim 7, further comprising a fluid regulator interposed between each drip hose and the associated port on the supply pipe.

10. The irrigation system of claim 7, wherein the mobile irrigation system is a center pivot irrigation system.

11. A method for modifying an existing mobile irrigation system for drip irrigation, comprising the steps of:
    removing existing sprinkler heads from mobile irrigation system supply pipes;
    connecting a plurality of drop lines to the supply pipe at the locations of the remove sprinkler heads, said drop lines of a length to extend from the supply pipe to a location spaced above, but proximal to the ground;
    connecting a plurality of drip hoses to the plurality of drop lines, each drip hose having a plurality of drip irrigation emitters along the length thereof;
    connecting a weight to each drop line proximal the lower end, of a weight sufficient to maintain the drop line in a generally vertical orientation and the drip hose with substantially its entire length in contact with the ground when the irrigation system is operated;
    and operating the mobile irrigation system to move the supply pipe and associated drip hoses through a field while the drip hoses supply water through the emitters.

12. The method of claim 11, wherein the existing mobile irrigation system is of the type having sprinkler heads along an upper side of the supply pipe, and wherein the step of connecting a plurality of drop lines includes the steps of:
    connecting a plurality of rigid tubular inverted U-shaped goosenecks to the supply pipe at the locations of the removed sprinkler heads; and
    connecting the plurality of drop lines to the plurality of goosenecks.

* * * * *